US012799435B2

(12) United States Patent
Creutz et al.

(10) Patent No.: US 12,799,435 B2

(45) Date of Patent: Nov. 17, 2026

(54) LAUNDRY SCENTING FORMULATION

(71) Applicant: Dow Silicones Corporation, Midland, MI (US)

(72) Inventors: Serge Creutz, Liege (BE); Rahma Benbakoura, Quaregnon (BE); Saugata Nad, Brussels (BE); Jacqueline L'hostis, Silly (BE); Flore Vandemeulebroucke, Manage (BE)

(73) Assignee: Dow Silicones Corporation, Midland, MI (US)

( * ) Notice: Subject to any disclaimer, the term of this patent is extended or adjusted under 35 U.S.C. 154(b) by 194 days.

(21) Appl. No.: 18/728,478

(22) PCT Filed: Jan. 19, 2023

(86) PCT No.: PCT/US2023/011095

§ 371 (c)(1),
(2) Date: Jul. 12, 2024

(87) PCT Pub. No.: WO2023/146783

PCT Pub. Date: Aug. 3, 2023

(65) Prior Publication Data

US 2025/0109362 A1 Apr. 3, 2025

Related U.S. Application Data

(60) Provisional application No. 63/303,113, filed on Jan. 26, 2022.

(51) Int. Cl.

| | |
|---|---|
| ***C11D 17/06*** | (2006.01) |
| ***C11D 3/22*** | (2006.01) |
| ***C11D 3/37*** | (2006.01) |
| ***C11D 3/50*** | (2006.01) |
| ***C11D 7/26*** | (2006.01) |
| ***C11D 7/60*** | (2006.01) |
| ***C11D 17/00*** | (2006.01) |

(52) U.S. Cl.

CPC .............. *C11D 3/505* (2013.01); *C11D 3/222* (2013.01); *C11D 3/3707* (2013.01); *C11D 3/373* (2013.01); *C11D 3/3788* (2013.01); *C11D 17/0086* (2013.01)

(58) Field of Classification Search

None

See application file for complete search history.

(56) References Cited

U.S. PATENT DOCUMENTS

| | | | | |
|---|---|---|---|---|
| 7,867,968 | B1 * | 1/2011 | Aouad | C11D 17/04 510/298 |
| 7,871,976 | B1 | 1/2011 | Aouad | |
| 8,476,219 | B2 | 7/2013 | Aouad | |
| 9,453,189 | B2 | 9/2016 | Aouad | |
| 9,708,574 | B2 | 7/2017 | Aouad | |
| 10,167,441 | B2 | 1/2019 | Aouad | |
| 10,266,797 | B2 | 4/2019 | Burgess et al. | |
| 10,329,519 | B2 | 6/2019 | Lynch et al. | |
| 2003/0060389 | A1 | 3/2003 | Ushio et al. | |
| 2015/0232791 | A1 * | 8/2015 | Droege | C11D 3/3765 510/349 |
| 2016/0022566 | A1 * | 1/2016 | Figura | A61K 8/898 510/125 |
| 2016/0215069 | A1 | 7/2016 | Stern et al. | |
| 2017/0226690 | A1 * | 8/2017 | Brain | B01J 13/06 |
| 2020/0231904 | A1 | 7/2020 | Hoessel et al. | |
| 2021/0130747 | A1 | 5/2021 | Subinya et al. | |

FOREIGN PATENT DOCUMENTS

| | | |
|---|---|---|
| WO | 2022182615 | 9/2022 |

* cited by examiner

*Primary Examiner* — Lorna M Douyon

(74) *Attorney, Agent, or Firm* — Thomas S. Deibert

(57) ABSTRACT

A laundry scenting formulation is provided, including water; a solid carrier; a structurant; and a scent additive; wherein the laundry scenting formulation is a solid.

9 Claims, No Drawings

LAUNDRY SCENTING FORMULATION

The present invention relates to a laundry scenting formulation. In particular, the present invention relates to a laundry scenting formulation, comprising: water, a solid carrier; a structurant; and a scent additive; wherein the laundry scenting formulation is a solid.

For decades consumers have sought to add fragrance to laundry during the cleaning process. An array of scented fabric conditioners are currently on the market for consumers. Such products typically combine perfumes with softening and conditioning agents to impart benefits to laundry such as a fresh smell, softness, static free, crease free or easier ironing. Some consumers desire additional scenting benefits. Such consumers have been referred to as scent seekers and have been known to over dose laundry products such as laundry detergent and fabric softener in an effort to impart a desired freshness to their laundry. There remains a need to provide scent delivery products to consumers that provide enhanced freshness to laundry. Such scenting compositions should be able to be applied by the consumer, independent of other laundry products, to achieve the laundry scent level desired by the individual consumer in a cost effective manner.

Laundry scent additives are disclosed by Aouad in U.S. Pat. No. 9,453,189 to enable consumers to control amount of scent imparted to their laundry. Aouad discloses a composition comprising a plurality of pastilles, said pastilles comprising: (a) polyethylene glycol; and (b) friable perfume microcapsules, wherein said perfume microcapsules comprise encapsulated perfume; wherein each of said pastilles has a mass from about 0.95 mg to about 2 g; and wherein each of said pastilles has a shape of hemispherical or compressed hemispherical.

Notwithstanding, there remains a need for new laundry scenting additives. In particular, it would be desirable to substitute some of the solid carrier in the scenting additive with water to reduce the cost of conventional laundry scenting compositions, while retaining the structural and scent delivery properties associated with such systems.

The present invention provides a laundry scenting formulation, comprising: 5 to 40 wt %, based on weight of the laundry scenting formulation, of water; 35 to 93.95 wt %, based on weight of the laundry scenting formulation, of a solid carrier; 0.05 to 5 wt %, based on weight of the laundry scenting formulation, of a structurant; and 1 to 25 wt %, based on weight of the laundry scenting formulation, of a scent additive; wherein the laundry scenting formulation is a solid.

The present invention provides a laundry scenting formulation, comprising: (i) 5 to 40 wt %, based on weight of the laundry scenting formulation, of water; (ii) 35 to 93.95 wt %, based on weight of the laundry scenting formulation, of a solid carrier; (iii) 0.05 to 5 wt %, based on weight of the laundry scenting formulation, of a structurant, wherein the structurant is an alkaline swellable emulsion polymer comprising: (a) 40 to 74.5 wt %, based on weight of alkaline swellable emulsion polymer, of structural units of $C_{1-4}$ alkyl acrylate; (b) 20 to 50 wt %, based on weight of alkaline swellable emulsion polymer, of structural units of $C_{3-6}$ carboxylic acid monomer; (c) 0.2 to 10 wt %, based on weight of alkaline swellable emulsion polymer, of structural units of a specialized associated monomer of formula I $$H_2C{=\!=}C(R^2)C(O)X(CH_2CH_2O)_n(CH(R^3)CH_2O)_tR^1 \qquad (I)$$

wherein X is selected from the group consisting of an —O— and an —N(H)—; wherein $R^1$ is selected from the group consisting of a $C_{8-24}$ alkyl, a $C_{8-16}$ alkylphenyl and a $C_{13-36}$ aralkylphenyl; wherein $R^2$ is selected from the group consisting of a hydrogen and a methyl; wherein $R^3$ is selected from the group consisting of a methyl and an ethyl; wherein n is an average of 6 to 100; wherein m is an average of 0 to 50; provided that n≥m and n+m is 6 to 100; and (d) 0 to 2.5 wt %, based on weight of alkaline swellable emulsion polymer, of structural units of multi-ethylenically unsaturated crosslinking monomer; and (iv) 1 to 25 wt %, based on weight of the laundry scenting formulation, of a scent additive; wherein the laundry scenting formulation is a solid.

The present invention provides a laundry scenting formulation, comprising: 5 to 40 wt %, based on weight of the laundry scenting formulation, of water; 35 to 93.95 wt %, based on weight of the laundry scenting formulation, of a solid carrier; 0.05 to 5 wt %, based on weight of the laundry scenting formulation, of a structurant, wherein the structurant is a cellulose derivative; and 1 to 25 wt %, based on weight of the laundry scenting formulation, of a scent additive; wherein the laundry scenting formulation is a solid.

The present invention provides a laundry scenting formulation, comprising: 5 to 40 wt %, based on weight of the laundry scenting formulation, of water; 35 to 93.95 wt %, based on weight of the laundry scenting formulation, of a solid carrier; 0.05 to 5 wt %, based on weight of the laundry scenting formulation, of a structurant, wherein the structurant is a hydrophobically modified alkylene oxide urethane; and 1 to 25 wt %, based on weight of the laundry scenting formulation, of a scent additive; wherein the laundry scenting formulation is a solid.

The present invention provides a laundry scenting formulation, comprising: 5 to 40 wt %, based on weight of the laundry scenting formulation, of water; 35 to 93.95 wt %, based on weight of the laundry scenting formulation, of a solid carrier; 0.05 to 5 wt %, based on weight of the laundry scenting formulation, of a structurant, wherein the structurant is a natural gum; and 1 to 25 wt %, based on weight of the laundry scenting formulation, of a scent additive; wherein the laundry scenting formulation is a solid.

The present invention provides a laundry scenting formulation, comprising: (i) 5 to 40 wt %, based on weight of the laundry scenting formulation, of water; (ii) 35 to 93.95 wt %, based on weight of the laundry scenting formulation, of a solid carrier; (iii) 0.05 to 5 wt %, based on weight of the laundry scenting formulation, of a structurant, wherein the structurant is an alkaline swellable emulsion polymer comprising: (a) 40 to 74.5 wt %, based on weight of alkaline swellable emulsion polymer, of structural units of $C_{1-4}$ alkyl acrylate; (b) 20 to 50 wt %, based on weight of alkaline swellable emulsion polymer, of structural units of $C_{3-6}$ carboxylic acid monomer; (c) 0.2 to 10 wt %, based on weight of alkaline swellable emulsion polymer, of structural units of a specialized associated monomer of formula I $$H_2C{=\!=}C(R^2)C(O)X(CH_2CH_2O)_n(CH(R^3)CH_2O)_mR^1 \qquad (I)$$

wherein X is selected from the group consisting of an —O— and an —N(H)—; wherein $R^1$ is selected from the group consisting of a $C_{8-24}$ alkyl, a $C_{8-16}$ alkylphenyl and a $C_{13-36}$ aralkylphenyl; wherein $R^2$ is selected from the group consisting of a hydrogen and a methyl; wherein $R^3$ is selected from the group consisting of a methyl and an ethyl; wherein n is an average of 6 to 100; wherein m is an average of 0 to 50; provided that n≥m and n+m is 6 to 100; and (d) 0 to 2.5 wt %, based on weight of alkaline swellable emulsion polymer, of structural units of multi-ethylenically unsaturated crosslinking monomer; (iv) 1 to 25 wt %, based on weight of the laundry scenting formulation, of a scent additive; and (v) 0.008 to <0.1 wt %, based on weight of the laundry scenting formulation, of a drainage aid component; wherein the drainage aid component comprises: 40 to 99 wt %, based on weight of the drainage aid component, of an organopolysiloxane comprising: 0 to 60 mol % of units of formula II and 40 to 100 mol % of units of formula III $$R_x^4SiO_{(4-x)2} \quad (II)$$

$$R_y^4R_z^5SiO_{(4-y-z)2} \quad (III)$$

wherein x is selected from the group consisting of 0, 1, 2 and 3; wherein y is selected from the group consisting of 0, 1 and 2; wherein z is selected from the group consisting of 1 and 2; with the proviso that y+z is 1, 2 or 3; wherein each $R^4$ is independently selected from a hydrogen, a hydroxy group and a group having 1 to 8 carbon atoms; wherein each $R^5$ is an $-A_cR^6$ group; wherein A is a divalent linking group; wherein c is selected from the group consisting of 0 and 1; wherein each $R^6$ is independently selected from a group having 9 to 35 carbon atoms; 1 to 30 wt %, based on weight of the drainage aid component, of an organosilicon resin; and 0 to 30 wt %, based on weight of the drainage aid component, of a hydrophobic additive; wherein the laundry scenting formulation is a solid.

The present invention provides a method for scenting laundry comprising: dosing to the laundry washing machine or the laundry wash basin a laundry scenting formulation according to the present invention; adding a fabric article to a laundry washing machine or a laundry wash basin; dosing water to the laundry washing machine or the laundry wash basin; and applying the water and the laundry scenting formulation to the fabric article; wherein the scent additive comprises a perfume which is applied to the fabric article.

DETAILED DESCRIPTION

It has been surprisingly found that with addition of a structurant; water can be substituted for some of the solid carrier used in laundry scenting formulations; while maintaining Shore A hardness of the composition and maintaining (or improving) the perfume delivery to laundry.

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polystyrene standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

The term "solid" in reference to the laundry scenting formulation of the present invention means that the laundry scenting formulation does not perceptibly change shape when placed on a rigid surface and left to stand for 24 hours in air at 22° C., a relative humidity of 30-50% and a pressure of 101.4 kPa.

Preferably, the laundry scenting formulation of the present invention, comprises: 5 to 40 wt % (preferably, 10 to 38 wt %; more preferably, 15 to 35 wt %; most preferably, 17 to 32 wt %), based on weight of the laundry scenting formulation, of water; 35 to 93.95 wt % (preferably, 40 to 87.925 wt %; more preferably, 46 wt % to 80.9 wt %; most preferably, 52.4 to 76.85 wt %), based on weight of the laundry scenting formulation, of a solid carrier; 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; and 1 to 25 wt % (preferably, 2 to 20 wt %; more preferably, 4 to 18 wt %; most preferably, 6 to 15 wt %), based on weight of the laundry scenting formulation, of a scent additive (preferably, wherein the scent additive is selected from the group consisting of a free perfume, a pro-perfume, an encapsulated perfume and mixtures thereof; more preferably, wherein the scent additive includes a mixture of a free perfume and an encapsulated perfume); wherein the laundry scenting formulation is a solid (preferably, wherein the laundry scenting formulation contains <3 wt % laundry actives).

Preferably, the laundry scenting formulation of the present invention, comprises 5 to 40 wt % (preferably, 10 to 38 wt %; more preferably, 15 to 35 wt %; most preferably, 17 to 32 wt %), based on weight of the laundry scenting formulation, of water; wherein the water is deionized water.

Preferably, the laundry scenting formulation of the present invention, comprises: 35 to 93.95 wt % (preferably, 40 to 87.925 wt %; more preferably, 46 wt % to 80.9 wt %; most preferably, 52.4 to 76.85 wt %), based on weight of the laundry scenting formulation, of a solid carrier; wherein the solid carrier is selected from the group consisting of polyethylene; polypropylene; copolymers of polyethylene and polypropylene; polyesters (e.g., polyethylene glycol); biodegradable polymers (e.g., polylactide and polyglycolic acid); polyurethanes; polyamides; polycarbonates; polysulfonates; polysiloxanes; polydienes (e.g., polybutylene, natural rubbers and synthetic rubbers); polyacrylates (e.g., polymethylmethacrylate); polystyrene; polyacrylonitrile butadiene styrene terpolymer; starch and mixtures thereof. More preferably, the laundry scenting formulation of the present invention, comprises: 35 to 93.95 wt % (preferably, 40 to 87.925 wt %; more preferably, 46 wt % to 80.9 wt %; most preferably, 52.4 to 76.85 wt %), based on weight of the laundry scenting formulation, of a solid carrier; wherein the solid carrier comprises polyethylene glycol (preferably, wherein the polyethylene glycol has a weight average molecular weight of 2,000 to 20,000 Daltons (preferably, 3,000 to 15,000 Daltons; more preferably, 4,000 to 12,000 Daltons; still more preferably, 5,000 to 11,000 Daltons; most preferably, 7,000 to 9,000 Daltons)). Still more preferably, the laundry scenting formulation of the present invention, comprises: 35 to 93.95 wt % (preferably, 40 to 87.925 wt %; more preferably, 46 wt % to 80.9 wt %; most preferably, 52.4 to 76.85 wt %), based on weight of the laundry scenting formulation, of a solid carrier; wherein the solid carrier comprises 50 to 100 wt % (preferably, 55 to 95 wt %; more preferably, 60 to 95 wt %; most preferably, 65 to 92.5 wt %), based on weight of the solid carrier, of polyethylene glycol (preferably, wherein the polyethylene glycol has a weight average molecular weight of 2,000 to 20,000 Daltons (preferably, 3,000 to 15,000 Daltons; more preferably, 4,000 to 12,000 Daltons; still more preferably, 5,000 to 11,000 Daltons; most preferably, 7,000 to 9,000 Daltons)); and 0 to 50 wt % (preferably, 5 to 45 wt %; more preferably, 5 to 40 wt %; most preferably, 7.5 to 35 wt %), based on weight of the solid carrier, of starch. Most preferably, the laundry scenting formulation of the present invention, comprises: 35 to 93.95 wt % (preferably, 40 to 87.925 wt %; more preferably, 46 wt % to 80.9 wt %; most preferably, 52.4 to 76.85 wt %), based on weight of the laundry scenting formulation, of a solid carrier; wherein the solid carrier is a polyethylene glycol (preferably, wherein the polyethylene glycol has a weight average molecular weight of 2,000 to 20,000 Daltons (preferably, 3,000 to 15,000 Daltons; more preferably, 4,000 to 12,000 Daltons; still more preferably, 5,000 to 11,000 Daltons; most preferably, 7,000 to 9,000 Daltons)).

Optionally, the solid carrier may comprise a low molecular weight polyethylene glycol to tailor certain properties of the solid carrier, such as, viscosity, melting point and water solubility. Preferably, the low molecular weight polyethylene glycol has a weight average molecular weight of 200 to 600 Daltons (preferably, 300 to 500 Daltons; more preferably, 350 to 475 Daltons; most preferably, 375 to 425 Daltons).

The polyethylene glycol used in the solid carrier may optionally include monomers other than ethylene oxide, in particular at low levels. Examples of such other monomers include other alkylene oxides (e.g., propylene oxide), glycidyl and other epoxide containing monomers, formaldehyde, organic alcohols and polyol monomers. Such other monomers can be included in the polyethylene glycol provided that the resulting material is solid at room temperature.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is selected from the group consisting of high molecular weight polymers of acrylic acid (e.g., homopolymers; and acrylic acid, crosslinked with an allyl ether pentaerythritol, an allyl ether of sucrose or allyl ether of propylene); an alkaline swellable emulsion polymer; a cellulose derivative; a hydrophobically modified alkylene oxide urethane; a natural gum and mixtures thereof. More preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is selected from the group consisting of an alkaline swellable emulsion polymer, a natural gum and mixtures thereof. Most preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is an alkaline swellable emulsion polymer.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a high molecular weight polymer of acrylic acid. More preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a high molecular weight polymer of acrylic acid having a molecular weight of 100,000 to 5,000,000 Daltons (preferably, 200,000 to 4,500,000 Daltons; more preferably, 425,000 to 4,250,000 Daltons). Most preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a high molecular weight polymer of acrylic acid having a molecular weight of 100,000 to 5,000,000 Daltons (preferably, 200,000 to 4,500,000 Daltons; more preferably, 425,000 to 4,250,000 Daltons) and wherein the high molecular weight polymer of acrylic acid is selected from homopolymers of acrylic acid and acrylic acid crosslinked with an allyl ether pentaerythritol, an allyl ether sucrose or an allyl ether of propylene.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is an alkaline swellable emulsion polymer. More preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is an alkaline swellable emulsion polymer comprising: (a) structural units of at least one nonionic vinyl monomer; (b) structural units of at least one acidic vinyl monomer; (c) structural units of at least one polyunsaturated amphiphilic macromonomer; and optionally (d) structural units of at least one multi-ethylenically unsaturated crosslinking monomer.

Examples of nonionic vinyl monomer include $C_{1-30}$ alkyl (meth)acrylates (e.g., methyl (meth)acrylate, ethyl (meth) acrylate, propyl (meth)acrylate, sec-butyl (meth)acrylate, iso-butyl (meth)acrylate, tert-butyl (meth)acrylate, hexyl (meth)acrylate, heptyl (meth)acrylate, octyl (meth)acrylate, 2-ethyl-hexyl (meth)acrylate, decyl (meth)acrylate, isodecyl (meth)acrylate, lauryl (meth)acrylate, tetradecyl (meth)acrylate, hexadecyl (meth)acrylate, stearyl (meth)acrylate, behenyl (meth)acrylate); $C_{1-30}$ alkyl (meth)acrylamides; styrene, substituted styrene (e.g., vinyl toluene, butyl styrene, isopropyl styrene, para-chloro styrent); vinyl esters (e.g., vinyl acetate, vinyl butyrate, vinyl caprolate, vinyl pivalate, vinyl neodecanoate); unsaturated nitriles (e.g., methacrylonitrile, acrylonitrile); unsaturated silanes (e.g., trimethylvinylsilane, dimethylethylvinylsilane, allyldimethylphenylsilane, allytrimethylsilane, 3-acrylamidopropyltrimethylsilane, 3-trimethylsilylpropyl methacrylate); and mixtures thereof.

Acid vinyl monomer include acidic, polymerizable, ethylenically unsaturated monomers containing at least one carboxylic acid group, sulfonic acid group or a phosphonic acid group. Examples of acidic vinyl carboxylic acid monomer include (meth)acrylic acid; itaconic acid; citraconic acid; maleic acid; fumaric acid; crotonic acid; aconitic; $C_{1-18}$ alkyl monoesters of maleic acid, fumaric acid, itaconic acid, aconitic acid; anhydrides of dicarboxylic acids; and salts thereof. Examples of sulfonic acid monomer include vinyl sulfonic acid, 2-sulfoethyl methacrylate, styrene sulfonic acid, 2-acrylamido-2-methylpropane sulfonic acid, allyloxybenzene sulfonic acid and salts thereof. Examples of phosphonic acid monomer include vinyl phosphonic acid, allyl phosphonic acid, 3-acrylamidopropyl phosphonic acid and salts thereof.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is an alkaline swellable emulsion polymer comprising: (a) 40 to 74.5 wt % (preferably, 50 to 72 wt %; more preferably, 55 to 70 wt %; most preferably, 58 to 68 wt %), based on weight of alkaline swellable emulsion polymer, of structural units of $C_{1-4}$ alkyl acrylate (preferably, $C_{2-4}$ alkyl acrylate; more preferably, $C_{2-3}$ alkyl acrylate; most preferably, ethyl acrylate); (b) 20 to 50 wt % (preferably, 25 to 45 wt %; more preferably, 29 to 40 wt %; most preferably, 33 to 37 wt %), based on weight of alkaline swellable emulsion polymer, of structural units of $C_{3-6}$ carboxylic acid monomer (preferably, (meth)acrylic acid; more preferably, methacrylic acid); (c) 0.2 to 10 wt % (preferably, 0.3 to 8 wt %; more preferably, 0.5 to 5 wt %; most preferably, 0.5 to 2 wt %), based on weight of alkaline swellable emulsion polymer, of structural units of a specialized associated monomer of formula I $$H_2C{=}C(R^2)C(O)X(CH_2CH_2O)_n(CH(R^3)CH_2O)_mR^1 \quad (I)$$

wherein X is selected from the group consisting of an —O— and an —N(H)— (preferably, wherein X is an —O—); wherein $R^1$ is selected from the group consisting of a $C_{8-24}$ alkyl, a $C_{8-16}$ alkylphenyl and a $C_{13-36}$ aralkylphenyl (preferably, wherein $R^1$ is a linear saturated $C_{10-24}$ alkyl group; more preferably, wherein $R^1$ is a linear saturated $C_{12-20}$ alkyl group; most preferably, wherein $R^1$ is a linear saturated $C_{16-18}$ alkyl group); wherein $R^2$ is selected from the group consisting of a hydrogen and a methyl (preferably, wherein $R^2$ is a methyl group); wherein $R^3$ is selected from the group consisting of a methyl and an ethyl; wherein n is an average of 6 to 100 (preferably, wherein n is an average of 7.5 to 50; more preferably, wherein n is an average of 10 to 30; most preferably, wherein n is an average of 12 to 25); wherein m is an average of 0 to 50 (preferably, wherein m is an average of 0 to 25; more preferably, wherein m is an average of 0 to 10; still more preferably, wherein m is an average of 0 to 5; most preferably, wherein m is 0); provided that n≥m and n+m is 6 to 100 (preferably, wherein n+m is 7.5 to 75; more preferably, wherein n+m is 10 to 40; still more preferably, wherein n+m is 12 to 30; most preferably, wherein n+m is 12 to 25); and (d) 0 to 2.5 wt % (preferably, 0 to 1 wt %; more preferably, 0 to 0.5 wt %; most preferably, 0.1 to 0.2 wt %), based on weight of alkaline swellable emulsion polymer, of structural units of multi-ethylenically unsaturated crosslinking monomer.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is an alkaline swellable emulsion polymer comprising: (a) 40 to 74.5 wt % (preferably, 50 to 72 wt %; more preferably, 55 to 70 wt %; most preferably, 58 to 68 wt %), based on weight of alkaline swellable emulsion polymer, of structural units of $C_{1-4}$ alkyl acrylate (preferably, $C_{2-4}$ alkyl acrylate; more preferably, $C_{2-3}$ alkyl acrylate; most preferably, ethyl acrylate); (b) 20 to 50 wt % (preferably, 25 to 45 wt %; more preferably, 29 to 40 wt %; most preferably, 33 to 37 wt %), based on weight of alkaline swellable emulsion polymer, of structural units of $C_{3-6}$ carboxylic acid monomer (preferably, (meth)acrylic acid; more preferably, methacrylic acid); (c) 0.2 to 10 wt % (preferably, 0.3 to 8 wt %; more preferably, 0.5 to 5 wt %; most preferably, 0.5 to 2 wt %), based on weight of alkaline swellable emulsion polymer, of structural units of a specialized associated monomer of formula Ia (Ia)

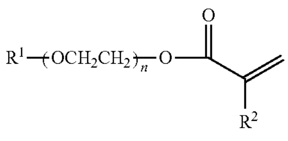

wherein $R^1$ is a linear saturated $C_{10-24}$ alkyl group (preferably, wherein $R^1$ is a linear saturated $C_{12-20}$ alkyl group; more preferably, wherein $R^1$ is a linear saturated $C_{16-18}$ alkyl group); wherein $R^2$ is selected from the group consisting of a hydrogen and a methyl (preferably, wherein $R^2$ is a methyl group); and wherein n is an average of 7.5 to 50 (preferably, wherein n is an average of 10 to 30; more preferably, wherein n is an average of 12 to 25); and (d) 0 to 2.5 wt % (preferably, 0 to 1 wt %; more preferably, 0 to 0.5 wt %; most preferably, 0.1 to 0.2 wt %), based on weight of alkaline swellable emulsion polymer, of structural units of multi-ethylenically unsaturated crosslinking monomer.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative. More preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative selected from the group consisting of hydroxyalkyl alkyl cellulose, hydroxyalkyl cellulose and mixtures thereof. Still more preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative selected from the group consisting of a hydroxyalkyl alkyl cellulose; wherein the hydroxyalkyl alkyl cellulose is selected from the group consisting of hydroxy-($C_{1-4}$)alkyl $C_{1-4}$ alkyl cellulose. Yet more preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative selected from the group consisting of a hydroxyalkyl alkyl cellulose; wherein the hydroxyalkyl alkyl cellulose is selected from the group consisting of hydroxyethyl methyl cellulose, hydroxypropyl methyl cellulose and mixtures thereof. Most preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative selected from the group consisting of a hydroxyalkyl alkyl cellulose; wherein the hydroxyalkyl alkyl cellulose is hydroxyethyl methyl cellulose.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative selected from the group consisting of a hydroxyalkyl alkyl cellulose; wherein the hydroxyalkyl alkyl cellulose has a weight average molecular weight, Mw, of 25,000 to 4,000,000 Daltons (preferably, 25,000 to 1,500,000 Daltons; more preferably, 25,000 to 500,000 Daltons; most preferably, 25,000 to 150,000 Daltons). More preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative selected from the group consisting of a hydroxyalkyl alkyl cellulose; wherein the hydroxyalkyl alkyl cellulose has a weight average molecular weight, Mw, of 25,000 to 4,000,000 Daltons (preferably, 25,000 to 1,500,000 Daltons; more preferably, 25,000 to 500,000 Daltons; most preferably, 25,000 to 150,000 Daltons); and wherein the hydroxyalkyl alkyl cellulose is selected from hydroxyethyl methyl cellulose, hydroxypropyl methyl cellulose and mixtures thereof. Most preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative selected from the group consisting of a hydroxyalkyl alkyl cellulose; wherein the hydroxyalkyl alkyl cellulose has a weight average molecular weight, Mw, of 25,000 to 4,000,000 Daltons (preferably, 25,000 to 1,500,000 Daltons; more preferably, 25,000 to 500,000 Daltons; most preferably, 25,000 to 150,000 Daltons); and wherein the hydroxyalkyl alkyl cellulose is hydroxyethyl methyl cellulose.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative selected from the group consisting of a hydroxyalkyl alkyl cellulose; wherein the hydroxyalkyl alkyl cellulose is a cellulose ether having alkyl and hydroxyalkyl derivatives in which average number of substituent groups per anhydroglucose unit is from 1 to 3 (preferably, 1.5 to 3; more preferably, 2 to 3). Preferably, the hydroxyalkyl groups have 1 to 4 carbon atoms (preferably, 1 to 3 carbon atoms; more preferably, 2 to 3 carbon atoms; most preferably, 2 carbon atoms). Preferably, alkyl groups have 1 to 4 carbon atoms (preferably, 1 to 3 carbon atoms; more preferably, 1 to 2 carbon atoms; most preferably, 1 carbon atom).

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative selected from the group consisting of a hydroxyalkyl alkyl cellulose; wherein the hydroxyalkyl alkyl cellulose has a substantially linear cellulose backbone. The term "substantially linear" as used herein and in appended claims means that 97 to 100 wt % (preferably, 99 to 100 wt %) of all glucose units in the hydroxyalkyl alkyl cellulose are in a main chain of the cellulose backbone.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a cellulose derivative selected from the group consisting of a hydroxyalkyl alkyl cellulose; wherein the hydroxyalkyl alkyl cellulose has a substantially β-1,4 linked backbone. The term "substantially β-1,4 linked backbone" as used herein and in appended claims means that 97 to 100 wt % (preferably, 99 to 100 wt %) of the glucose units in the hydroxyalkyl alkyl cellulose are bounded together with β-1,4 linkages. When less than 100 wt % of the glucose units are bounded together with β-1,4 linkages, the remaining glucose units may be bounded in a variety of ways, including, for example, β-1,2; β-1,3; β-1,6; β-2,3; α-1,2; α-1,3; α-1,4; α-1,6 and α-2,3 linkages and mixtures thereof.

Optionally, the cellulose derivative is reversibly cross-linked, for example, via treatment with a dialdehyde.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is hydrophobically modified alkylene oxide urethane polymer. More preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is hydrophobically modified alkylene oxide urethane polymer selected from the group consisting of hydrophobically modified ethylene oxide urethane polymer, a hydrophobically modified propylene oxide urethane polymer, a hydrophobically modified ethylene oxide/propylene oxide urethane copolymer, a hydrophobically modified ethylene oxide/butylene oxide urethane copolymer, a hydrophobically modified ethylene oxide/propylene oxide/butylene oxide urethane terpolymer and mixtures thereof. Most preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is hydrophobically modified alkylene oxide urethane polymer is a hydrophobically modified ethylene oxide urethane polymer.

Preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a natural gum. More preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a natural gum selected from the group consisting of agar, alginic acid, sodium aldinate, carrageenan, gum Arabic, gum ghatti, gum tragacanth, karaya gum, guar gum, locust bean gum, beta-glucan, dammar gum, glucomannan, *psyllium* seed husks, tara gum, gellan gum, xanthan gum, and mixtures thereof. Still more preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a natural gum selected from the group consisting of carrageenan, guar gum, locust bean gum, xanthan gum, and mixtures thereof. Yet more preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a natural gum selected from the group consisting of guar gum, xanthan gum and mixtures thereof. Most preferably, the laundry scenting formulation of the present invention, comprises: 0.05 to 5 wt % (preferably, 0.075 to 2 wt %; more preferably, 0.1 to 1 wt %; most preferably, 0.15 to 0.6 wt %), based on weight of the laundry scenting formulation, of a structurant; wherein the structurant is a natural gum is xanthan gum.

Preferably, the laundry scenting formulation of the present invention comprises <0.5 wt % (preferably, <0.01 wt %;

more preferably, <0.001 wt %; still more preferably, <0.0001 wt %; most preferably, <the detectable limit), based on weight of the detergent formulation, of crosslinked carboxymethylcellulose.

Preferably, the laundry scenting formulation of the present invention, comprises 1 to 25 wt % (preferably, 2 to 20 wt %; more preferably, 4 to 18 wt %; most preferably, 6 to 15 wt %), based on weight of the laundry scenting formulation, of a scent additive; wherein the scent additive is selected from the group consisting of a free perfume, a pro-perfume, an encapsulated perfume and mixtures thereof. More preferably, the laundry scenting formulation of the present invention, comprises 1 to 25 wt % (preferably, 2 to 20 wt %; more preferably, 4 to 18 wt %; most preferably, 6 to 15 wt %), based on weight of the laundry scenting formulation, of a scent additive; wherein the scent additive includes a mixture of a free perfume and an encapsulated perfume. Most preferably, the laundry scenting formulation of the present invention, comprises: 2 to 12 wt %, based on weight of the laundry scenting formulation, of a free perfume and 2 to 12 wt %, based on weight of the laundry scenting formulation, of an encapsulated perfume.

The term "perfume" used herein and in appended claims refers to an odoriferous material that is released from the laundry scenting formulation of the present invention into at least one of (a) the wash water used to clean laundry, (b) the rinse water used to clean laundry and (c) the laundry contacted with (a) or (b). The perfume used in the laundry scenting formulation will typically be a liquid a ambient temperatures. A range of substances are known for use as perfumes including, for example, aldehydes, ketones and esters. Naturally occurring plant and animal oils and exudates comprised of complex mixtures of components are known for use as perfumes. Perfumes may comprises woody/earthy bases with exotic materials including sandalwood, civet and patchouli oil. The perfume may be of a light floral fragrance such as rose extract, lilac and violet extract. The perfume may provide fruity odors such as lime, lemon and orange. The perfume may deliver an aromatherapy effect, such as providing a relaxing or invigorating mood.

The term "pro-perfume" used herein and in appended claims refers to a perfume precursor that releases a desirable odor and/or perfume molecule through the breaking of a chemical bond. Typically a pro-perfume is a desired perfume raw material chemically linked to a carrier (preferably, wherein the carrier is slightly or sparingly volatile). The pro-perfume is frequently designed to increase deposition onto a fabric article. The perfume is subsequently released through breaking of the bond between the perfume raw material and the carrier through a change in pH (e.g., exposure to perspiration), moisture in the environment, heat, enzymatic action, exposure to sunlight during storage or line drying.

The term "free perfume" used herein and in appended claims refers to perfume that contains less than 0.1 wt %, based on weight of the perfume, of a perfume carrier; wherein the perfume carrier is selected from the group consisting of cyclodextrin, zeolites and combinations thereof.

The term "encapsulated perfume" used herein and in appended claims refers to perfume that is encapsulated. The encapsulated perfume can be friable or moisture activated.

Preferably, the encapsulated perfume comprises a perfume encapsulated by a melamine/formaldehyde shell. Encapsulated perfumes are commercially available from, for example, Appleton, Quest International and International Flavor & Fragrances.

Preferably, the laundry scenting formulation of the present invention, further comprises: a drainage aid component (preferably, 0.008 to 5 wt % (more preferably, 0.009 to 0.09 wt %; still more preferably, 0.01 to 0.05 wt %; most preferably, 0.02 to 0.04 wt %), based on weight of the laundry scenting formulation, of the drainage aid component); wherein the drainage aid component comprises: (i) 40 to 99 wt % (preferably, 55 to 99 wt %; more preferably, 65 to 98 wt %; most preferably, 77 to 97 wt %), based on weight of the drainage aid component, of an organopolysiloxane comprising: 0 to 60 mol % of units of formula II and 40 to 100 mol % of units of formula III $$R_x^4SiO_{(4-x)2} \qquad (II)$$

$$R_y^4R_z^5SiO_{(4-y-z)2} \qquad (III)$$

wherein x is selected from the group consisting of 0, 1, 2 and 3; wherein y is selected from the group consisting of 0, 1 and 2; wherein z is selected from the group consisting of 1 and 2; with the proviso that y+z is 1, 2 or 3; wherein each $R^4$ is independently selected from a hydrogen, a hydroxy group and a group having 1 to 8 carbon atoms; wherein each $R^5$ is an $-A_cR^6$ group; wherein A is a divalent linking group; wherein c is selected from the group consisting of 0 and 1; wherein each $R^6$ is independently selected from a group having 9 to 35 carbon atoms; (ii) 1 to 30 wt % (preferably, 1 to 25 wt %; more preferably, 2 to 20 wt %; most preferably, 3 to 15 wt %), based on weight of the drainage aid component, of an organosilicon resin; and (iii) 0 to 30 wt % (preferably, 0 to 20 wt %; more preferably, 0 to 15 wt %; most preferably, 0 to 8 wt %), based on weight of the drainage aid component, of a hydrophobic additive.

Preferably, the drainage aid component comprises: 40 to 99 wt % (preferably, 55 to 99 wt %; more preferably, 65 to 98 wt %; most preferably, 77 to 97 wt %), based on weight of the drainage aid component, of an organopolysiloxane; wherein the organopolysiloxane comprises: 0 to 60 mol % of units of formula II and 40 to 100 mol % of units of formula III $$R_x^4SiO_{(4-x)2} \qquad (II)$$

$$R_y^4R_z^5SiO_{(4-y-z)2} \qquad (III)$$

wherein x is selected from the group consisting of 0, 1, 2 and 3; wherein y is selected from the group consisting of 0, 1 and 2 (preferably, 0 and 1; more preferably, 1); wherein z is selected from the group consisting of 1 and 2 (preferably, 1); with the proviso that y+z is 1, 2 or 3 (preferably, 2); wherein each $R^4$ is independently selected from a hydrogen, a hydroxy group and a group having 1 to 8 carbon atoms (preferably, a $C_{1-4}$ alkyl group; more preferably, a $C_{1-2}$ alkyl group; most preferably, a methyl group)(preferably, wherein ≤one $R^4$ per Si is a hydroxy group); wherein each $R^5$ is an $-A_cR^6$ group; wherein A is a divalent linking group; wherein c is selected from the group consisting of 0 and 1 (preferably, 0); wherein each $R^6$ is independently selected from a group having 9 to 35 carbon atoms (preferably, 10 to 30 carbon atoms; more preferably, 10 to 20 carbon atoms; most preferably, 10 to 15 carbon atoms)(preferably, wherein each $R^6$ contains 0 to 1 oxygen atoms; more preferably, wherein each $R^6$ contains no oxygen atoms)(preferably, wherein each $R^6$ contains 0 nitrogen atoms)(preferably, wherein at least 50 mol % (preferably, 65 to 100 mol %; more preferably, 70 to 100 mol %; most preferably, 75 to 100 mol %) of the units of formula III in the organopolysiloxane contain at least one $R^5$). More preferably, the drainage aid component, comprises: 40 to 99 wt % (preferably, 55 to 99 wt %; more preferably, 65 to 98 wt %; most preferably, 77 to 97 wt %), based on weight of the drainage aid component, of an organopolysiloxane; wherein the organopolysiloxane is a linear organopolysiloxane of formula IV (IV)

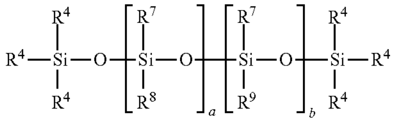

wherein each $R^4$ is independently selected from a hydrogen, a hydroxy group and a group having 1 to 8 carbon atoms (preferably, a $C_{1-4}$ alkyl group; more preferably, a $C_{1-2}$ alkyl group; most preferably, a methyl group)(preferably, wherein ≤one $R^4$ per Si is a hydroxy group); wherein each $R^7$ is independently selected from the group consisting of a hydrogen, a group having 1 to 8 carbon atoms, an $R^8$ and an $R^9$ (preferably, wherein each $R^7$ is independently selected from a hydrogen and a group having 1 to 8 carbon atoms; more preferably, wherein each $R^7$ is independently selected from a $C_{1-4}$ alkyl group; still more preferably, wherein each $R^7$ is independently selected from a $C_{1-2}$ alkyl group; most preferably, wherein each $R^7$ is a methyl group); wherein each $R^8$ is independently selected from an acyclic group having 9 to 35 carbon atoms (preferably, 10 to 30 carbon atoms; more preferably, 10 to 20 carbon atoms; most preferably, 10 to 15 carbon atoms)(preferably, wherein each $R^8$ contains 0 to 1 oxygen atoms; more preferably, wherein each $R^8$ contains no oxygen atoms)(preferably, wherein each $R^8$ contains 0 nitrogen atoms); wherein each $R^9$ is independently selected from an alkylaryl group; wherein a is 10 to 500; wherein b is 0 to 250 and wherein a+b is 10 to 500 (preferably, 25 to 250; more preferably, 30 to 100; most preferably, 45 to 75) (preferably, wherein a≥b; more preferably, wherein a≥b) (preferably, wherein >60 mol % (preferably, ≥65 mol %; more preferably, ≥70 mol %; most preferably, ≥75 mol %) of the Si atoms in the linear organopolysiloxane of formula IV have an $R^8$ group attached)(preferably, wherein b=0). Most preferably, the drainage aid component, of the present invention, comprises: 40 to 99 wt % (preferably, 55 to 99 wt %; more preferably, 65 to 98 wt %; most preferably, 77 to 97 wt %), based on weight of the drainage aid component, of an organopolysiloxane; wherein the organopolysiloxane is a linear organopolysiloxane of formula IV; wherein each $R^4$ is independently selected from a hydrogen, a hydroxy group and a group having 1 to 8 carbon atoms (preferably, a $C_{1-4}$ alkyl group; more preferably, a $C_{1-2}$ alkyl group; most preferably, a methyl group)(preferably, wherein ≤one $R^4$ per Si is a hydroxy group); wherein each $R^7$ is independently selected from the group consisting of a hydrogen, a group having 1 to 8 carbon atoms, an $R^8$ and an $R^9$ (preferably, wherein each $R^7$ is independently selected from a hydrogen and a group having 1 to 8 carbon atoms; more preferably, wherein each $R^7$ is independently selected from a $C_{1-4}$ alkyl group; still more preferably, wherein each $R^7$ is independently selected from a $C_{1-2}$ alkyl group; most preferably, wherein each $R^7$ is a methyl group); wherein each $R^8$ is an $-A_cR^{10}$ group; wherein each $R^{10}$ is independently selected from an acyclic group having 9 to 35 carbon atoms (preferably, an acyclic $C_{10-30}$ alkyl group; more preferably, an acyclic $C_{10-20}$ alkyl group; most preferably, an acyclic $C_{10-15}$ alkyl group)(preferably, wherein each $R^{10}$ is a hydrocarbyl group); wherein c is selected from the group consisting of 0 and 1 (preferably, wherein c is 0); and wherein A is a divalent linking; wherein each $R^9$ is a $—YR^{11}$ group; wherein Y is selected from the group consisting of a divalent alkylene group having 2 to 10 (preferably, 2 to 4; more preferably, 2) carbon atoms and 0 to 2 (preferably, 0 to 1; more preferably, 0) oxygen atoms; and wherein $R^{11}$ is at least one $—C_6R^{12}{}_6$ aromatic ring; wherein each $R^{12}$ is independently selected from a hydrogen, a halogen, a hydroxyl, a $C_{1-6}$ alkoxy group, a $C_{1-12}$ alkyl group or wherein two or more R groups together represent a divalent hydrocarbon group joining together two or more aromatic rings (preferably, wherein each $R^9$ is independently selected from the group consisting of styrene, α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4-dimethylstyrene, 2,5-dimethylstyrene, 2,4,6-trimethylstyrene and mixtures thereof; most preferably, α-methyl styrene); wherein a is 10 to 500; wherein b is 0 to 250 and wherein a+b is 10 to 500 (preferably, 25 to 250; more preferably, 30 to 100; most preferably, 45 to 75)(preferably, wherein a≥b; more preferably, wherein a≥b)(preferably, wherein >60 mol % (preferably, ≥65 mol %; more preferably, ≥70 mol %; most preferably, ≥75 mol %) of the Si atoms in the linear organopolysiloxane of formula IV have an $R^8$ group attached)(preferably, wherein b=0).

Preferably, the organopolysiloxane of the drainage aid component has a degree of polymerization of 10 to 500. More preferably, the organopolysiloxane of the drainage aid component has a degree of polymerization of 25 to 250. Still more preferably, the organopolysiloxane of the drainage aid component has a degree of polymerization of 30 to 100. Most preferably, the organopolysiloxane of the drainage aid component has a degree of polymerization of 45 to 75.

Preferably, the organopolysiloxane of the drainage aid component is a linear organopolysiloxane; wherein the linear organopolysiloxane comprises <0.1 wt % (preferably, <0.01 wt %; more preferably, <0.001 wt %; most preferably, <detectable limit) of trifunctional siloxane units. Preferably, the organopolysiloxane of the drainage aid component is a linear organopolysiloxane; wherein the linear organopolysiloxane comprises <0.1 wt % (preferably, <0.01 wt %; more preferably, <0.001 wt %; most preferably, <the detectable limit) of trifunctional siloxane units; and wherein the linear organopolysiloxane comprises <the detectable limit of aromatic moieties (e.g., α-methyl styrene moieties).

The divalent linking group, A, when present in the organopolysiloxane of the drainage aid component, preferably consists of (i) oxygen; (ii) carbon and hydrogen; or (iii) carbon, hydrogen, oxygen and optionally nitrogen, sulfur and/or phosphorus. Oxygen when present in the divalent linking group, A, is selected from the group consisting of an ether oxygen, an ester oxygen, a substituted hydroxyl, a substituted alkoxy group and a combination thereof. Nitrogen when present in the divalent linking group, A, is selected from the group consisting of an amino group, an amido group and combinations thereof. The divalent linking group, A, when present in the organopolysiloxane is preferably selected from the group consisting of alkylene ester groups, alkylene ether groups, amide groups, polyamino/amido groups and mercapto groups, such as, —O—, $—CH_2CH_2OC(=O)—$, $—CH_2CH_2OCH_2CH(OH)—$, $—(CH_2)_3NHC(=O)—$, $—(CH_2)_3NHCH_2C(=O)—$, $—CH_2CH_2S—$ and

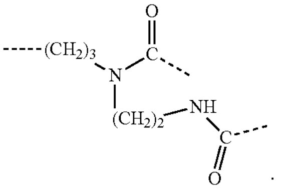

Preferably, the organopolysiloxane of the drainage aid component is nonionic.

Preferably, the drainage aid component comprises: 1 to 30 wt % (preferably, 1 to 25 wt %; more preferably, 2 to 20 wt %; most preferably, 3 to 15 wt %), based on weight of the drainage aid component, of an organosilicon resin; wherein the organosilicon resin is comprised primarily of $R_{313}SiO_{1/2}$ and $SiO_{4/2}$ units (i.e., M and Q units, respectively); wherein each $R^{13}$ is selected from the group consisting of a functional or non-functional, substituted or unsubstituted monovalent radical (preferably, a hydroxyl group, a hydrocarbon group and a hydrocarbonoxy group). The number ratio of the M groups to Q groups is preferably 0.4:1 to 2.5:1 (more preferably, 0.4:1 to 1.5:1; most preferably, 0.5:1 to 1.1:1). While the organosilicon resin preferably contains only M and Q units, the organosilicon resin may include a limited number of $R_{213}SiO_{2/2}$ and $R^{13}SiO_{3/2}$ units (i.e., D and T units, respectively). Preferably, the organosilicon resin is an MQ silicone resin. As used herein, the term "MQ silicone resin" means that, on average, no more than 20 mole percent (preferably, no more than 15 mole percent; more preferably, no more than 10 mole percent; still more preferably, no more than 5 mole percent; most preferably, no more than 1 mole percent) of the organosilicon units are comprised of D and T units.

Preferably, the drainage aid component comprises: 0 to 30 wt % (preferably, 0 to 20 wt %; more preferably, 0 to 15 wt %; most preferably, 0 to 8 wt %), based on weight of the drainage aid component, of a hydrophobic additive; wherein hydrophobic additive is selected from the group consisting of silica, titania, alumina, ground quartz, magnesium oxide, zinc oxide, salts of aliphatic carboxylic acids (e.g., calcium or aluminum stearates), reaction products of isocyanates with certain cyclohexylamine and alkyl amides (e.g., ethylene or methylene bis stearamide). More preferably, the drainage aid component comprises: 0 to 30 wt % (preferably, 0 to 20 wt %; more preferably, 0 to 15 wt %; most preferably, 0 to 8 wt %), based on weight of the drainage aid component, of a hydrophobic additive; wherein the hydrophobic additive is selected from silica particles. Most preferably, the drainage aid component comprises: 0 to 30 wt % (preferably, 0 to 20 wt %; more preferably, 0 to 15 wt %; most preferably, 0 to 8 wt %), based on weight of the drainage aid component, of a hydrophobic additive; wherein hydrophobic additive is selected from silica particles having an average particle size of 0.1 to 50 μm (preferably, 1 to 20 μm) and a surface area of at least 50 $m^2/g$. The silica particles may be rendered hydrophobic, e.g., by treating with dialkylsilyl groups and/or trialkylsilyl groups either bonded directly onto the silica or by means of a silicone resin. Preferably, the silica particles are rendered hydrophobic with dimethyl and/or trimethyl silyl groups. The silica materials may be selected from fumed silica, precipitated silica, hydrothermal silica and gel formation silica.

Preferably, the drainage aid component contains <0.1 wt %, based on weight of the drainage aid component, of a hydrophobic particulate material (e.g., silica, titania, alumina, ground quartz, magnesium oxide, zinc oxide, salts of aliphatic carboxylic acids (e.g., calcium or aluminium stearates), reaction products of isocyanates with certain materials (for example cyclohexylamine and alkyl amides, e.g., ethylene or methylene bis stearamide).

Preferably, the drainage aid component optionally contains an optional material selected from the group consisting of a binder/encapsulant (e.g., a polyacrylic binder), a surfactant and a solid support.

Binders/encapsulants used in the drainage aid component may include polyoxyalkylene polymers (e.g., polyethylene glycol, which can be applied molten or as an aqueous solution and spray dried); reaction products of tallow alcohol and ethylene oxide or polypropylene glycol; polycarboxylates (e.g., polyacrylic acid, partial sodium salts of polyacrylic acid, copolymers of acrylic acid and maleic anhydride); cellulose ethers (e.g., sodium carboxymethylcellulose); gelatin; agar; microcrystalline waxes; fatty acids or fatty alcohols having 12 to 20 carbon atoms and a melting point in the range 45 to 80° C.; a monoester of glycerol with such a fatty acid; a mixture of a water insoluble wax having a melting point of 55 to 100° C. and a water-insoluble emulsifying agent, glucose or hydrogenated glucose.

Surfactant used in the drainage aid component can be selected to facilitate dispersal of the organopolysiloxane from the binder/encapsulant. Silicone glycols are preferred surfactants for use in combination with many binder/encapsulants. Fatty alcohol ether sulphates or linear alkylbenzene sulphonates are preferred for use in combination with polyacrylic acid type binder/encapsulants. The surfactant may be added to the organopolysiloxane of the drainage aid component undiluted or in emulsion before the organopolysiloxane is mixed with the binder/encapsulant, or the surfactant and the organopolysiloxane may successively be added to the binder/encapsulant.

Solid support used in the drainage aid component is preferably selected from zeolites (e.g. Zeolite A, Zeolite X), aluminosilicates, silicates (e.g., magnesium silicate), phosphates (e.g., powdered or granular sodium tripolyphosphate), sodium sulphate, sodium carbonate, sodium perborate, a cellulose derivative (e.g., sodium carboxymethylcellulose), granulated starch, clay, sodium citrate, sodium acetate, sodium bicarbonate and native starch.

Preferably, the laundry scenting formulation of the present invention, further comprises an optional ingredient selected from the group consisting of a dye, a particulate spacer, a foam regulator and mixtures thereof.

Preferably, the laundry scenting formulation of the present invention, optionally further comprises 0 to 0.1 wt % (preferably, 0.001 to 0.1 wt %; more preferably, 0.01 to 0.02 wt %), based on weight of the laundry scenting formulation, of a dye. Dyes used in the solid laundry drainage aid laundry scenting formulation may include those typically used in laundry treating products (e.g., detergent, fabric softener).

The laundry scenting formulation of the present invention, optionally further comprises a particulate spacer material. More preferably, the laundry scenting formulation of the present invention, optionally further comprises a particulate spacer material; wherein 0 to 50 wt % (preferably, 0 to 45 wt %; more preferably, 0 to 40 wt %) of the solid carrier is replaced by the particulate spacer material. Preferably, the laundry scenting formulation of the present invention, optionally further comprises a particulate spacer material; wherein 0 to 50 wt % (preferably, 0 to 45 wt %; more preferably, 0 to 40 wt %) of the solid carrier is replaced by the particulate spacer material; wherein the particulate spacer material has a mean particle size of 55 to 750 microns (preferably, 75 to 650 microns; more preferably, 95 to 600 microns; most preferably, 100 to 250 microns). Preferably, the particulate spacer material is non-water soluble or exhibits a water dissolution rate significantly lower than that of the solid carrier (i.e., wherein the dissolution rate of the solid carrier divided by the dissolution rate of the particulate spacer material is at least 2). Preferably, the particulate spacer material occupies 0 to 0.5 vol % (preferably, 0.1 to 0.5 vol %; more preferably, 0.15 to 0.45 vol %; most preferably, 0.2 to 0.45 vol %) of the laundry scenting formulation of the present invention. The particulate spacer material may have a variety of shapes including spherical, polyhedron, granule, fibrillar and crystalline. Preferably, the particulate spacer material is a solid over the temperature range of 25 to 70° C. The particulate spacer material is preferably selected from the group consisting of organic particulate material, inorganic particulate material and combinations thereof. Preferably, the particulate spacer material is selected from the group consisting of alkali metal borates (e.g., sodium borate, sodium tetraborate, disodium tetraborate, potassium tetraborate); glass microspheres (e.g., soda lime glass microspheres, hollow glass microspheres, borosilicate solid glass microspheres); polyalkylene microspheres (e.g., polyethylene microspheres, polypropylene microspheres); ceramic microspheres and mixtures thereof.

Preferably, the laundry scenting formulation of the present invention, optionally further comprises a foam regulator. More preferably, the laundry scenting formulation of the present invention, optionally further comprises a foam regulator; wherein the foam regulator is selected from the group consisting of organomodified silicones, polydimethyl silicones and fatty acids. Most preferably, the laundry scenting formulation of the present invention, optionally further comprises a foam regulator; with the proviso that when the foam regulator is an organomodified silicone, said organomodified silicone is compositionally different from that included in the drainage aid component.

Preferably, the laundry scenting formulation of the present invention contains <3 wt % (preferably, <2 wt %; more preferably, <1 wt %; still more preferably, <0.1 wt %; yet more preferably, <0.01 wt %; most preferably, <0.0001 wt %) laundry actives. Laundry actives include, for example, detergent surfactants, detergent builders, bleaching agents, enzymes and mixtures thereof. A non-detersive level of surfactant may be used to facilitate solubilization of the drainage aid component in the solid carrier.

Preferably, the laundry scenting formulation of the present invention is provided as a pastille (more preferably, as a plurality of pastilles). More preferably, the laundry scenting formulation of the present invention is provided as a pastille (more preferably, as a plurality of pastilles) having a shape selected from the group consisting of tablets, polyhedrons, granules, spheres, hemispheres, compressed hemispheres, lentils and oblong shape (preferably, hemispheres and compressed hemispheres). Most preferably, the laundry scenting formulation of the present invention is provided as a plurality of pastilles having a compressed hemispherical shape. The term "compressed hemispherical" as used herein and in appended claims refers to a shape corresponding to a hemisphere that is at least partially flattened, whereby the radius of the compressed hemisphere is shorter along an axis tangential to the flattened surface relative to the radius of the compressed hemisphere along an axis along the flattened surface. Preferably, the compressed pastilles have a ratio of height to diameter of 0.01 to 0.4 (preferably, 0.1 to 0.4; more preferably, 0.2 to 0.3). Preferably, the individual pastilles have a volume of 0.003 to 0.15 $cm^3$. Preferably, the pastilles have a weight of 0.95 mg to 2 g. Preferably, a plurality of pastilles collectively comprise a unit dose for dosing to a laundry washing machine or a laundry wash basin. Preferably, a unit does of the laundry scenting formulation of the present invention comprises 2 to 40 g (preferably, 3 to 35 g; more preferably, 4 to 30 g; most preferably, 5 to 28 g) of pastilles.

Preferably, the laundry scenting formulation of the present invention is provided in a package containing a single unit dose or a plurality of unit doses. The package may be selected from the group consisting of a bottle, a bag or other suitable container. Preferably, the package is a PET bottle.

Preferably, the package containing the laundry scenting formulation of the present invention comprises a dosing means for measuring and dispensing the laundry scenting formulation to a washing machine or wash basin. Examples of dosing means include a dispensing cap or dome that is functionally attached to the package. The dosing means may be releasably detachable from and reatachable to the package.

Preferably, the method of making the laundry scenting formulation of the present invention comprises: providing a solid carrier (preferably, wherein the solid carrier has a melting point above 25° C.)(preferably, wherein the solid carrier is a polyethylene glycol having a melting point above 25° C.); providing a structurant; providing water; providing a scent additive; optionally providing a drainage aid component; melting the solid carrier (preferably, wherein the solid carrier is heated to a temperature above its melting point); mixing the structurant with water to form a blend; adding the blend to the molten solid carrier to form a mixture; adding the scent additive to the mixture; optionally adding the drainage aid component, if any, and any other optional ingredients (e.g., dyes, particular spacers, foam regulators) with the heated mixture to form a melt composition; and cooling the melt composition (preferably to a temperature below the melting point temperature for the solid carrier) to form a non-porous water dissolvable (or dispersible) solid (e.g., plurality of pastilles) using well known techniques.

Preferably, the method of scenting laundry of the present invention, comprises: dosing to a laundry washing machine or a laundry wash basin (preferably, to a laundry washing machine) a laundry scenting formulation according to the present invention (optionally, other fabric care products can be dosed to the laundry washing machine or the laundry wash basin, e.g., laundry detergent, fabric softener); adding laundry (preferably, wherein the laundry comprises fabric articles, wherein the fabric articles are selected from a cotton fabric and a polyester cotton blend fabric; more preferably, wherein the laundry comprises fabric articles, wherein the fabric articles comprise a cotton fabric) to the laundry washing machine or the laundry wash basin (preferably, to the laundry washing machine); dosing water to the laundry washing machine or the laundry wash basin (preferably, to the laundry washing machine); and applying the water and the laundry scenting formulation to the laundry; wherein the scent additive comprises a perfume which is applied to the laundry.

Some embodiments of the present invention will now be described in detail in the following Examples.

Example S1: Polymer Synthesis

To a 3-liter, 4-necked round bottom flask equipped with a mechanical stirrer, thermocouple, condenser and nitrogen sparge is added deionized water (729 g) and sodium lauryl sulfate (2 g). The reactor is purged with nitrogen and warmed to 90° C. Separately, (1) a monomer emulsion (A) is prepared from deionized water (556 g), sodium lauryl sulfate (25 g), ethyl acrylate (EA)(448 g), methacrylic acid (MAA)(151 gm) and a lipophilically modified monomer (LIPO) (7 g) having the following structure

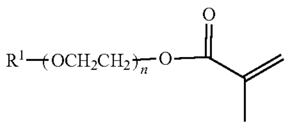

wherein $R^1$ is a linear saturated $C_{16-8}$ alkyl group; and wherein n is an average of 15 to 19. (2) Monomer emulsion additive (B) is prepared by mixing trimethylolpropane diallylether (TMPDAE)(1.12 g) and MAA (93 g). (3) Initiator solution C1 is prepared by dissolving ammonium persulfate (0.4 g) in deionized water (19 g). (4) Initiator solution C2 is prepared by dissolving ammonium persulfate (0.7 g) in deionized water (42 g). At ~90° C. reactor temperature, the reactor is charged with initiator solution C1. Then monomer emulsion (A) is charged into reactor while monomer emulsion additive (B) is charged simultaneously to monomer emulsion (A). The rate is controlled so that the both feeds finished in 120 min. Separately, initiator solution C2 is fed into the reactor in 120 min. After these additions are completed, the monomer emulsion and initiator feed lines are rinsed with deionized water followed with monomer chasing with free radical catalyst and activator. The resulting latex is recovered and pH adjusted to 7 with sodium hydroxide.

Comparative Examples C1-C4 and Example 1-4: Laundry Scenting Formulation

Solid laundry scenting formulations according to Comparative Examples C1-C4 and Examples 1-4 were prepared with the components in amounts listed in TABLE 1 using the following procedure. The polyethylene glycol (PEG) was added to a flask and heated at 80° C. until melted. The additive was then slowly added into the molten PEG with stirring. The flask contents were then cooled to 65° C. and then the fragrance was added to the flask contents with stirring. The flask contents were then poured onto a smooth metal surface a room temperature to obtain the product solid laundry scenting formulation in the form of solid flakes.

TABLE 1

| | PEG[1] | Additive | | |
|---|---|---|---|---|
| Ex. | (g) | Description | (g) | Fragrance[2] |
| C1 | 35 | 1 wt % aqueous silicate[3] solution | 10 | 5 |
| C2 | 35 | 1 wt % aqueous silicate[4] solution | 10 | 5 |
| C3 | 35 | 1 wt % aqueous bentonite[5] solution | 10 | 5 |
| C4 | 35 | deionized water | 10 | 5 |
| 1 | 35 | 1 wt % aqueous soln of polymer Example S1 | 10 | 5 |
| 2 | 35 | 1 wt % aqueous soln of cellulose derivative[6] | 10 | 5 |

TABLE 1-continued

| | PEG[1] | Additive | | |
|---|---|---|---|---|
| Ex. | (g) | Description | (g) | Fragrance[2] |
| 3 | 35 | 1 wt % aqueous soln of HEUR[7] | 10 | 5 |
| 4 | 35 | 1 wt % aqueous soln of xanthan gum[8] | 10 | 5 |

[1]CARBOWAX™ Polyethylene Glycol 8000 from The Dow Chemical Company
[2]Tornado Fresh from International Flavors & Fragrances Inc.
[3]Laponite XL21 synthetic layered silicate from Eckart Effect Pigments
[4]Laponite XLS synthetic layered silicate from Eckart Effect Pigments
[5]Bentonite from Amcol
[6]SUPRACARE™ 760 additive from The Dow Chemical Company
[7]ACUSOL™ 880 hydrophobically modified non-ionic polyol (HEUR) from The Dow Chemical Company
[8]KELTROL ® xanthan gum from CP Kelco

Hardness

The indentation hardness of the solid laundry scenting formulations prepared according to Comparative Examples C1-C4 and Examples 1-4 were measured according to ASTM D 2240 using a Shore Instrument and Manufacturing Co. durometer. The average Shore A hardness of five separate measurements per solid laundry scenting formulation is provided in TABLE 2.

TABLE 2

| Example | Hardness (Shore A) |
|---|---|
| C1 | 56 |
| C2 | <30 |
| C3 | <20 |
| C4 | 10 |
| 1 | 77 |
| 2 | 74 |
| 3 | 70 |
| 4 | 69 |

We claim:

1. A laundry scenting formulation, comprising:

5 to 40 wt %, based on weight of the laundry scenting formulation, of water;

35 to 93.95 wt %, based on weight of the laundry scenting formulation, of a solid carrier; wherein the solid carrier is polyethylene glycol;

0.05 to 5 wt %, based on weight of the laundry scenting formulation, of a structurant; and 1 to 25 wt %, based on weight of the laundry scenting formulation, of a scent additive;

wherein the laundry scenting formulation is a solid, and wherein the structurant is an alkaline swellable emulsion polymer comprising:

(a) 40 to 74.5 wt %, based on weight of alkaline swellable emulsion polymer, of structural units of $C_{1-4}$ alkyl acrylate;

(b) 20 to 50 wt %, based on weight of alkaline swellable emulsion polymer, of structural units of $C_{3-6}$ carboxylic acid monomer;

(c) 0.2 to 10 wt %, based on weight of alkaline swellable emulsion polymer, of structural units of a specialized associated monomer of formula I $$H_2C{=}C(R^2)C(O)X(CH_2CH_2O)_n(CH(R^3)CH_2O)_mR^1 \quad (1)$$

wherein X is selected from the group consisting of an —O— and an —N(H)—; wherein $R^1$ is selected from the group consisting of a $C_{8-24}$ alkyl, a $C_{8-16}$ alkylphenyl and a $C_{13-36}$ aralkylphenyl; wherein $R^2$ is selected from the group consisting of a hydrogen and a methyl; wherein $R^3$ is selected from the group consisting of a methyl and an ethyl; wherein n is an average of 6 to 100; wherein m is an average of 0 to 50; provided that n≥m and n+m is 6 to 100; and (d) 0 to 2.5 wt %, based on weight of alkaline swellable emulsion polymer, of structural units of multi-ethylenically unsaturated crosslinking monomer.

2. The laundry scenting formulation of claim 1, wherein the structurant further comprises a cellulose derivative.

3. The laundry scenting formulation of claim 1, wherein the structurant further comprises a hydrophobically modified alkylene oxide urethane.

4. The laundry scenting formulation of claim 1, wherein the structurant further comprises a natural gum.

5. The laundry scenting formulation of claim 1, wherein the structurant further comprises a high molecular weight polymer of acrylic acid having a molecular weight of 100,000 to 5,000,000 Daltons.

6. The laundry scenting formulation of claim 1, wherein the laundry scenting formulation is in the shape of a pastille.

7. The laundry scenting formulation of claim 1, further comprising 0.008 to <0.1 wt %, based on weight of the laundry scenting formulation, of a drainage aid component; wherein the drainage aid component comprises:

40 to 99 wt %, based on weight of the drainage aid component, of an organopolysiloxane comprising:

0 to 60 mol % of units of formula II $$R_x^4SiO_{(4-x)/2} \quad (II)$$

40 to 100 mol % of units of formula III $$R_y^4R_z^5SiO_{(4-y-2)/2} \quad (III)$$

wherein x is selected from the group consisting of 0, 1, 2 and 3; wherein y is selected from the group consisting of 0, 1 and 2; wherein z is selected from the group consisting of 1 and 2; with the proviso that y+z is 1, 2 or 3; wherein each $R^4$ is independently selected from a hydrogen, a hydroxy group and a group having 1 to 8 carbon atoms; wherein each $R^5$ is an $-A_cR^6$ group; wherein A is a divalent linking group; wherein c is selected from the group consisting of 0 and 1; wherein each $R^6$ is independently selected from the group consisting of 9 to 35 carbon atoms;

1 to 30 wt %, based on weight of the drainage aid component, of an organosilicon resin; and 0 to 30 wt %, based on weight of the drainage aid component, of a hydrophobic additive.

8. The laundry scenting formulation of claim 1, further comprising an optional additive selected from the group consisting of a dye, a particulate spacer, a foam regulator and mixtures thereof.

9. A method for scenting laundry comprising:

dosing to a laundry washing machine or a laundry wash basin the laundry scenting formulation according to claim 1;

adding a fabric article to the laundry washing machine or the laundry wash basin;

dosing water to the laundry washing machine or the laundry wash basin; and applying the water and the laundry scenting formulation to the fabric article;

wherein the scent additive comprises a perfume which is applied to the fabric article.

* * * * *